US012621045B2

(12) United States Patent
Rao et al.

(10) Patent No.: US 12,621,045 B2
(45) Date of Patent: May 5, 2026

(54) COMMUNICATION CONTROL METHOD AND DEVICE, MOBILE PLATFORM, AND STORAGE MEDIUM

(71) Applicant: SZ DJI TECHNOLOGY CO., LTD., Shenzhen (CN)

(72) Inventors: Xiongbin Rao, Shenzhen (CN); Qingwen Wang, Shenzhen (CN); Yuan Sheng, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 336 days.

(21) Appl. No.: 18/459,698

(22) Filed: Sep. 1, 2023

(65) Prior Publication Data

US 2023/0412251 A1 Dec. 21, 2023

Related U.S. Application Data

(63) Continuation of application No. PCT/CN2021/078553, filed on Mar. 1, 2021.

(51) Int. Cl.
*H04B 7/185* (2006.01)
*H04W 72/0453* (2023.01)

(52) U.S. Cl.
CPC .... *H04B 7/18504* (2013.01); *H04W 72/0453* (2013.01)

(58) Field of Classification Search
CPC .......... H04B 7/18504; H04W 72/0453; H04W 4/023; H04W 4/06; H04W 72/51;
(Continued)

(56) References Cited

U.S. PATENT DOCUMENTS

2020/0068516 A1* 2/2020 Ma ....................... G05D 1/0094
2020/0301450 A1* 9/2020 Li ........................... G05D 1/104
(Continued)

FOREIGN PATENT DOCUMENTS

CN 107968692 A 4/2018
CN 108040368 A 5/2018
(Continued)

OTHER PUBLICATIONS

CN-111316576 English translation (Year: 2020).*
(Continued)

*Primary Examiner* — Yu-Wen Chang
(74) *Attorney, Agent, or Firm* — ANOVA LAW GROUP, PLLC

(57) ABSTRACT

A communication control method includes, in response to communication between a first mobile platform and a first controller via a first communication link, obtaining one or more broadcast signals received by the first mobile platform within a predetermined time range, determining an in-range platform quantity of the second mobile platforms present in a predetermined range of the first mobile platform according to signal information of each of the one or more broadcast signals, and determining a strategy for selecting a frequency to be used by the first mobile platform when communicating with the first controller via the first communication link according to the in-range platform quantity. The one or more broadcast signals are sent by a second mobile platform.

20 Claims, 4 Drawing Sheets

In response to a communication between the first mobile platform and a first controller via a first communication link, obtain one or more broadcast signals received by the first mobile platform within a predetermined time range, the one or more broadcast signals sent by a second mobile platform — S301

Determine a quantity of second mobile platforms present in a predetermined range of the first mobile platform according to signal information of the one or more broadcast signals — S302

Determine a strategy for selecting a frequency to be used by the first mobile platform when transmitting a downstream signal to a controller according to the quantity of the second mobile platforms — S303

(58) Field of Classification Search
CPC ...... H04W 4/30; H04W 72/541; B64U 10/14; B64U 2101/20; B64U 2101/30; H04K 3/00
See application file for complete search history.

(56) References Cited

U.S. PATENT DOCUMENTS

| | | | | |
|---|---|---|---|---|
| 2023/0074011 A1* | 3/2023 | Chetlur Ravi | ........ | H04W 16/28 |
| 2023/0217266 A1* | 7/2023 | Freedman | .............. | H04W 4/02 |
| | | | | 370/329 |

FOREIGN PATENT DOCUMENTS

| | | | | | |
|---|---|---|---|---|---|
| CN | 111316576 A | | 6/2020 | | |
| CN | 112105086 A | * | 12/2020 | ............ | G06N 3/045 |
| WO | 2019149162 A1 | | 8/2019 | | |

OTHER PUBLICATIONS

CN-112105086 English translation (Year: 2020).*
The World Intellectual Property Organization (Wipo) International Search Report for PCT/CN2021/078553 Oct. 26, 2021.

* cited by examiner

40MHz

125MHz

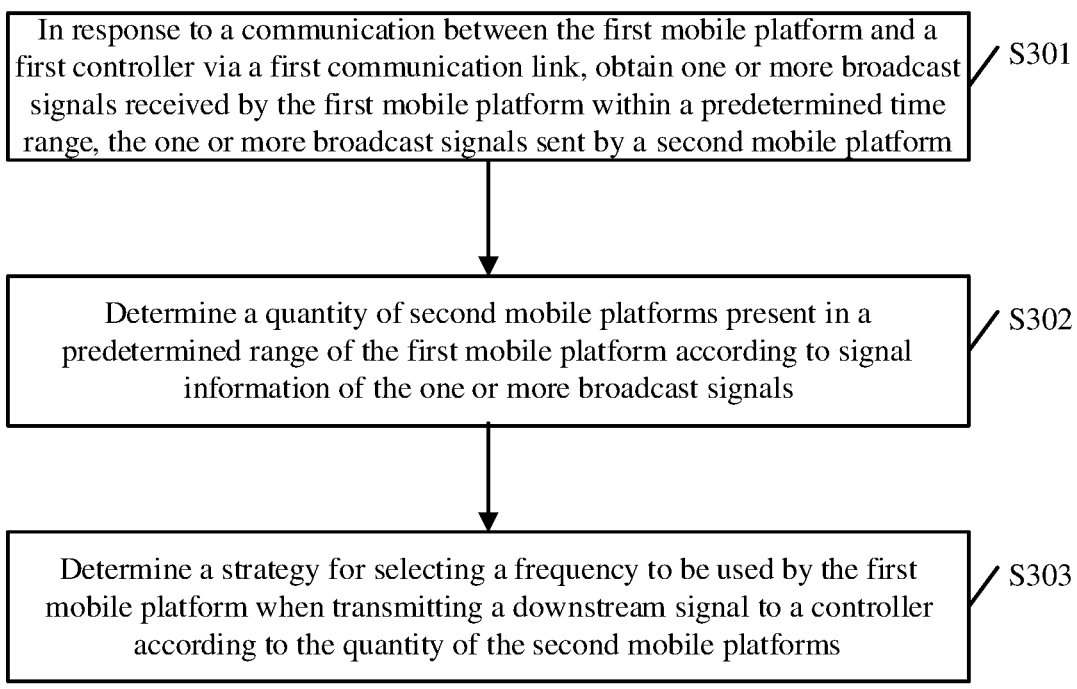

In response to a communication between the first mobile platform and a first controller via a first communication link, obtain one or more broadcast signals received by the first mobile platform within a predetermined time range, the one or more broadcast signals sent by a second mobile platform

S301

Determine a quantity of second mobile platforms present in a predetermined range of the first mobile platform according to signal information of the one or more broadcast signals

S302

Determine a strategy for selecting a frequency to be used by the first mobile platform when transmitting a downstream signal to a controller according to the quantity of the second mobile platforms

| DATA | RS | RS | DATA | SS | SS | DATA |

DATA is a data symbol, RS and SS is pilot sequences

FIG. 4

COMMUNICATION CONTROL METHOD AND DEVICE, MOBILE PLATFORM, AND STORAGE MEDIUM

CROSS-REFERENCE TO RELATED APPLICATION

This application is a continuation of International Application No. PCT/CN2021/078553, filed Mar. 1, 2021, the entire content of which is incorporated herein by reference.

TECHNICAL FIELD

The present disclosure relates to the communication technology field and, more particularly, to a communication control method, a communication control device, a mobile platform, and a storage medium.

BACKGROUND

Nowadays, mobile platforms, such as unmanned aerial vehicles (UAVs), unmanned vehicles, or mobile robots, can be applied to scenarios like image or video collecting. Take UAV as an example, when a plurality of UAVs are used to collect images or videos in a surrounding environment, the plurality of UAVs can interfere with each other when transmitting data such as image or video. Thus, data transmission efficiency is low, and data transmission experience is poor. Thus, it is important to improve the efficiency and experience when the plurality of UAVs perform data transmission.

SUMMARY

In accordance with the disclosure, there is provided a communication control method. The method is applied to a first mobile platform. The method includes in response to communication between a first mobile platform and a first controller via a first communication link, obtaining one or more broadcast signals received by the first mobile platform within a predetermined time range, determining an in-range platform quantity of the second mobile platforms present in a predetermined range of the first mobile platform according to signal information of each of the one or more broadcast signals, and determining a strategy for selecting a frequency to be used by the first mobile platform when communicating with the first controller via the first communication link according to the in-range platform quantity. The one or more broadcast signals are sent by a second mobile platform.

Also in accordance with the disclosure, there is provided a communication control device, including a processor and a memory. The memory stores a program that, when executed by the processor, causes the processor to, in response to communication between a first mobile platform and a first controller via a first communication link, obtain one or more broadcast signals received by the first mobile platform within a predetermined time range, determine an in-range platform quantity of the second mobile platforms present in a predetermined range of the first mobile platform according to signal information of each of the one or more broadcast signals, and determine a strategy for selecting a frequency to be used by the first mobile platform when communicating with the first controller via the first communication link according to the in-range platform quantity. The one or more broadcast signals are sent by a second mobile platform.

Also in accordance with the disclosure, there is provided a mobile platform. The mobile platform is a first mobile platform. The mobile platform includes a body, a dynamic system, and a processor. The dynamic system is arranged at the body and configured to provide dynamic power for the mobile platform to move. The processor is configured to, in response to communication between a first mobile platform and a first controller via a first communication link, obtain one or more broadcast signals received by the first mobile platform within a predetermined time range, determine an in-range platform quantity of the second mobile platforms present in a predetermined range of the first mobile platform according to signal information of each of the one or more broadcast signals, and determine a strategy for selecting a frequency to be used by the first mobile platform when communicating with the first controller via the first communication link according to the in-range platform quantity. The one or more broadcast signals are sent by a second mobile platform.

BRIEF DESCRIPTION OF THE DRAWINGS

FIG. 3 is a schematic flowchart of a communication control method consistent with an embodiment of the present disclosure.

FIG. 4 is a schematic format diagram of a broadcast signal consistent with an embodiment of the present disclosure.

DETAILED DESCRIPTION OF THE EMBODIMENTS

The technical solution of embodiments of the present disclosure is described in detail in connection with accompanying drawings of embodiments of the present disclosure. Described embodiments are some embodiments of the present disclosure, not all embodiments. Based on embodiments of the present disclosure, all other embodiments obtained by those of ordinary skill in the art without creative effort should be within the scope of the present disclosure.

Embodiments of the present disclosure are described in detail in connection with the accompanying drawings. When there is no conflict, features of embodiments of the present disclosure can be combined with each other.

In some embodiments, a plurality of unmanned aerial vehicles (UAVs) can collect images or videos simultaneously. For example, a first mobile platform and a second mobile platform can simultaneously collect images in a surrounding environment. Currently, when the first mobile platform transmits collected image data to a first controller that is communicatively connected to the first mobile platform, the first mobile platform can select an optimal frequency band to transmit the image data to the first controller by using a self-adaptive algorithm. If the second mobile platform also needs to transmit the collected image to a second controller that is communicatively connected to the second mobile platform in a process of the first mobile platform performing the image data transmission, the second mobile platform can also select the optimal frequency band by using a self-adaptive algorithm. However, the optimal frequency band is currently occupied by the first mobile platform to transmit the image data, and available frequency bands that can be applied by a mobile platform are limited. Thus, the second mobile platform cannot select an appropriate frequency band to perform the image data transmission, which affects the image data transmission efficiency of the second mobile platform.

Figure 1:
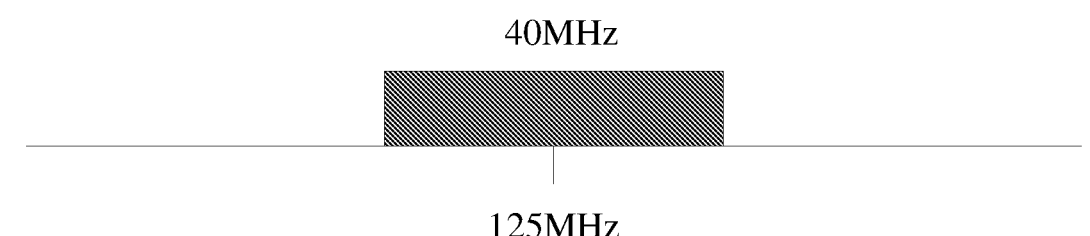
FIG. 1 is a schematic diagram showing a frequency band self-adaptively selected by a plurality of unmanned aerial vehicles (UAVs).

Taking a UAV as an example, the available frequency band for the UAV can be limited. For example, a 125 MHz frequency band (i.e., a frequency band having a bandwidth of 125 MHz) can be available at a working frequency of 5.8 GHz. Assuming an operation bandwidth of the UAV is 40 MHz, if UAV A self-adaptively selects a 40 MHz frequency band (i.e., a frequency band having a bandwidth of 40 MHz) in the middle of the available frequency band of the 5.8 GHz working frequency, UAV B can no longer find a suitable 40 MHz frequency band for communication, as shown in FIG. 1. FIG. 1 is a schematic diagram showing a frequency band self-adaptively selected by a plurality of UAVs. As shown in FIG. 1, UAV A self-adaptively selects an optimal 40 MHz frequency band in the middle for data transmission, and UAV B cannot self-adaptively find a 40 MHz frequency band for data transmission.

To address the above problem, the present disclosure provides a communication control method, which is applied to a communication control system. The communication control system can include a first mobile platform, a first controller, a second mobile platform, a second controller, and a communication control device. In some embodiments, in the communication control system, the first mobile platform and the first controller can communicate with each other via a first communication link, and the second mobile platform and the second controller can communicate with each other via a second communication link.

In the communication control method of embodiments of the present disclosure, the second mobile platform entering the second communication link can periodically transmit a first broadcast signal, and the first mobile platform can also periodically transmit a second broadcast signal via the first communication link. When the first mobile platform receives one or more first broadcast signals within a predetermined time range, a quantity of second mobile platforms existing in a predetermined range of the first mobile platform can be determined according to signal information of the first broadcast signals of the one or more first broadcast signals. A frequency band to be used by the first mobile platform when transmitting a downstream signal to the first controller according to the quantity of the second mobile platforms. In this disclosure, the quantity of the second mobile platforms in the predetermined range of the first mobile platform is also referred to as an "in-range platform quantity."

By selecting the frequency band for transmitting the downstream signal in the above manner, the interference problem that the second mobile platform cannot select the frequency band for data transmission because the first mobile platform self-adaptively selects the optimal frequency band during data transmission can be avoided. Thus, the first mobile platform and the second mobile platform can select different frequency bands simultaneously for data transmission, which improves the data transmission efficiency.

Figure 2:
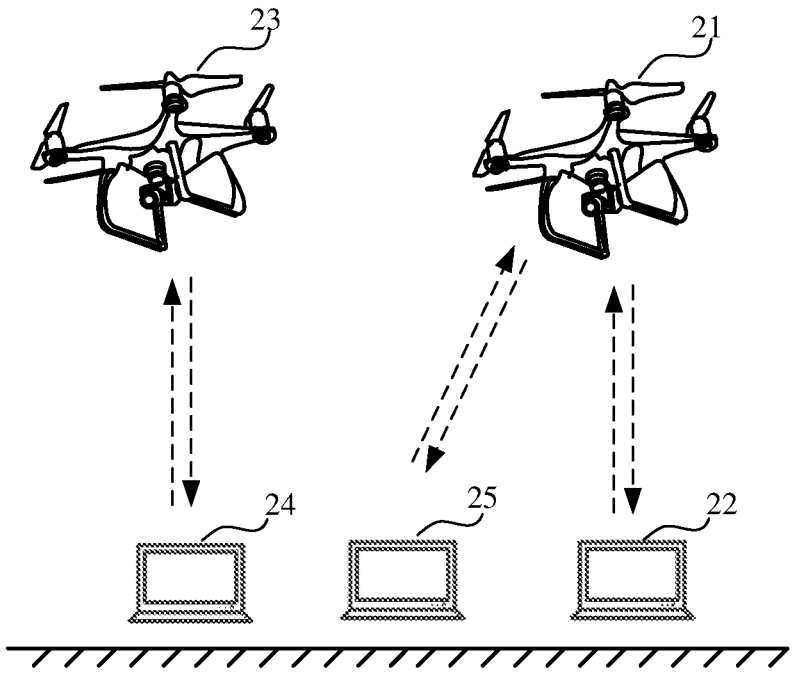
FIG. 2 is a schematic structural diagram of a communication control system consistent with an embodiment of the present disclosure.

The communication control system of embodiments of the present disclosure is further illustrated in FIG. 2.

FIG. 2 is a schematic structural diagram of the communication control system consistent with an embodiment of the present disclosure. The communication control system includes a first mobile platform 21, a first controller 22, a second mobile platform 23, a second controller 24, and a communication control device 25. In some embodiments, the first mobile platform 21 and the first controller 22 can be configured to establish a first communication link. In some embodiments, the second mobile platform 23 and the second controller 24 can be configured to establish a second communication link. In some embodiments, the communication control device 25 can be arranged on the first mobile platform 21. For example, the communication control device 25 can be a member of the first mobile platform 21. In some embodiments, the communication control device 25 can be spatially independent from the first mobile platform 21 and communicatively connected to the first mobile platform 21. In some embodiments, the first mobile platform 21 can include but is not limited to a UAV, an unmanned vehicle, an unmanned ship, a mobile robot, or another mobile device such as a manned mobile vehicle. The second mobile platform 23 can include but is not limited to a UAV, an unmanned vehicle, an unmanned ship, a mobile robot, or another mobile device such as a manned mobile vehicle. In some embodiments, the first controller 22 can include but is not limited to a remote controller, a computer, a tablet, a smartphone, and another terminal device. The second controller 24 can include but is not limited to a remote controller, a computer, a tablet, a smartphone, and another terminal device.

In embodiments of the present disclosure, the communication control device 25 can be configured to obtain one or more first broadcast signals received by the first mobile platform 21 via the first communication link within the predetermined time range. The communication control device 25 can be further configured to determine the quantity of second mobile platforms 23 present within the predetermined range of the first mobile platform 21 according to the signal information of the one or more first broadcast signals, and determine a strategy for selecting a frequency to be used by the first mobile platform 21 to transmit a downstream signal to the first controller 22 based on the quantity of the second mobile platform(s) 23. Thus, the interference among the plurality of mobile platforms during data transmission operations can be reduced, and the data transmission efficiency can be improved.

FIGS. 3 to 8 illustrates the communication control method of embodiments of the present disclosure.

FIG. 3 is a schematic flowchart of the communication control method consistent with an embodiment of the present disclosure. The method can be performed by the communication control device. The communication control device is described above. The method of embodiments of the present disclosure includes the following processes.

At S301, one or more first broadcast signals received by the first mobile platform within the predetermined time range are obtained via the first communication link.

In embodiments of the present disclosure, the communication control device can obtain, via the first communication link, the one or more first broadcast signals received by the first mobile platform within the predetermined time range.

In some embodiments, a first broadcast signal can include one or more pilot sequences. In some embodiments, a format of the first broadcast signal is shown in FIG. 4. FIG. 4 is a schematic diagram showing the format of the broadcast signal consistent with an embodiment of the present disclosure. As shown in FIG. 4, the first broadcast signal includes pilot sequences (RS, SS) and data symbol DATA. In some embodiments, the data symbol DATA can carry a device identification of the second mobile platform sending the first broadcast signal and the position of the first broadcast signal sent by the second mobile platform.

For example, assuming that the second mobile platform transmits a first broadcast signal every T0 ms, and the data symbol DATA carries position k, the position for the second mobile platform transmitting the first broadcast signal can be determined to be a kth ms within T0 ms. In some embodiments, k can be randomly selected from a predetermined position set S, such as S={1, 11, 21, 41}.

In embodiments of the present disclosure, the broadcast signal (e.g., the first broadcast signal or the second broadcast signal) can include characteristics of the certain pilot sequences (RS, SS), which ensures that other devices (e.g., the first mobile platform or the second mobile platform) can mutually and synchronically search for the short-frame signals transmitted among the devices. In some embodiments, since the broadcast signals are sent periodically and the data symbol carries the position of transmitting the broadcast signals, a certain device can be ensured to be able to adjust the radio frequency (RF) time of the device after being synchronized with the broadcast signal of another device to align with the RF airtime of others. In some embodiments, the data symbol of the broadcast signal can carry the device identification of the device transmitting the broadcast signal. Thus, after being synchronized with the broadcast signal of another device, the device can know the device identification of the another device. Therefore, after receiving the broadcast signals of the plurality of devices, the device can determine the quantity of the devices in operation according to the device identifications.

In some embodiments, when the communication control device obtains the one or more first broadcast signals received by the first mobile platform within the predetermined time range via the first communication link, the communication control device can select a first position from the predetermined position set according to a predetermined cycle and obtain the first broadcast signal received by the first mobile platform at the first position. In some embodiments, the predetermined cycle can be T0 ms. In some embodiments, the predetermined position set can be S. Taking the UAV as an example, the first UAV can select position k from position set S every T0 ms to receive the first broadcast signal according to the predetermined cycle T0 ms.

In some embodiments, the communication control device can also select a second position from the predetermined position set according to the predetermined cycle and broadcast the second broadcast signal at the second position. Thus, the first mobile platform can also determine the presence and quantity of the first mobile platforms by receiving the second broadcast signals. In some embodiments, the format of the second broadcast signal can be the same as the format of the first broadcast signal.

In some embodiments, the first mobile platform and the second mobile platform can perform the time boundary alignment before receiving the broadcast signals. Thus, when the first mobile platform receives the first broadcast signal sent by the second mobile platform, the second mobile platform can also receive the second broadcast signal sent by the first mobile platform simultaneously.

Figure 5:
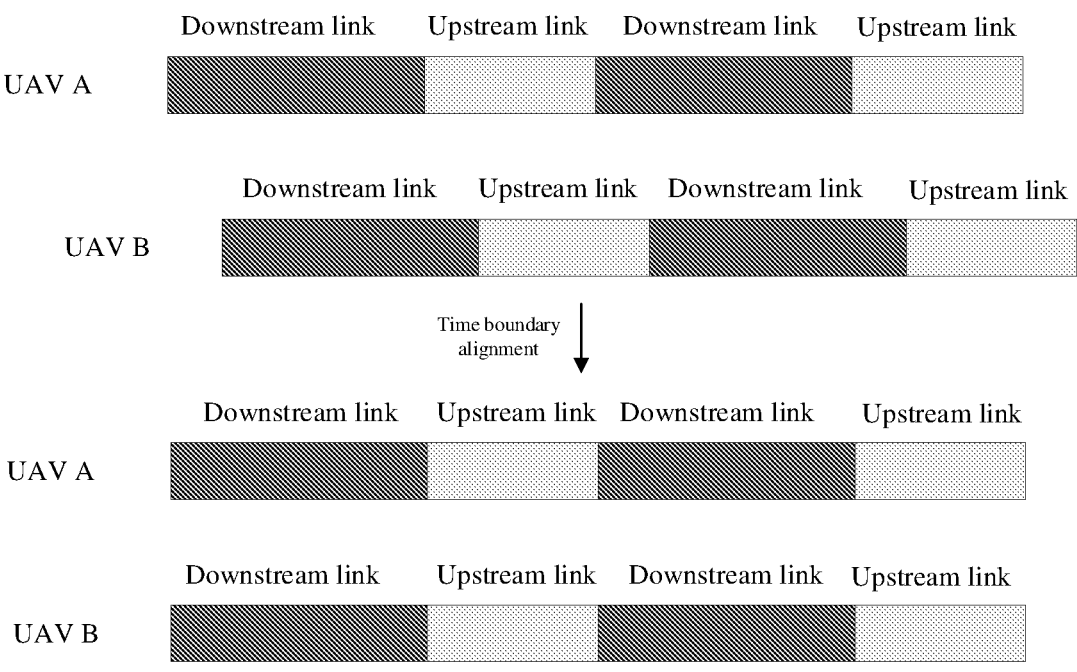
FIG. 5 is a schematic diagram showing time boundary alignment processing consistent with an embodiment of the present disclosure.

In some embodiments, the time boundary alignment processing for the first mobile platform and the second mobile platform is shown in FIG. 5. FIG. 5 is a schematic diagram showing the time boundary alignment processing consistent with an embodiment of the present disclosure, includes diagrams before and after the time boundaries of the first mobile platform and the second mobile platform are aligned.

During the time boundary alignment processing for the first mobile platform and the second mobile platform, and after the first mobile platform and the second mobile platform are powered on, the first mobile platform and the second mobile platform can simultaneously search for broadcast signals. If the first mobile platform does not synchronically find the first broadcast signal sent by the second mobile platform within T1 ms, the first mobile platform can determine that the first mobile platform is first to power on, start to transmit the second broadcast signal at T2 ms, and synchronically search for the first broadcast signal sent by the second mobile platform again. If the first mobile platform does not find the first broadcast signal sent by the second mobile platform, the first mobile platform can continue to transmit the second broadcast signal and wait for the first controller to be connected. In some embodiments, T1, T2, and T3 can be from predetermined position set S.

At S302, according to the signal information of the one or more first broadcast signals, the quantity of the second mobile platform(s) present within the predetermined range of the first mobile platform is determined.

In embodiments of the present disclosure, the communication control device can be configured to determine the quantity of the second mobile platform(s) present within the predetermined range of the first mobile platform based on the signal information of the one or more first broadcast signals.

In some embodiments, the signal information can include a signal strength and a device identification. In some embodiments, the device identification can be used to indicate the second mobile platform that sends the first broadcast signal.

In some embodiments, when the communication control device determines the quantity of the second mobile platform(s) present in the predetermined range of the first mobile platform according to the signal information of the one or more first broadcast signals, the signal strengths and device identifications of the first broadcast signals can be obtained. The device identification can be used to indicate the second mobile platform that sends the first broadcast signal. The communication control device can be further configured to determine the quantity of the second mobile platform(s) present in the predetermined range of the first mobile platform according to the signal strengths and device identifications of the first broadcast signals.

In some embodiments, the one or more first broadcast signals may include first broadcast signals that have the same device identification, which indicates that they are sent by the same second mobile platform. Thus, determining the quantity of the second mobile platform(s) present within the predetermined range of the first mobile platform can include determining one or more candidate first broadcast signals having a same device identification and each having a signal strength greater than or equal to a predetermined strength threshold, and determining the mobile platform corresponding to the one or more candidate broadcast signals (i.e., the mobile platform sending the one or more candidate broadcast signals) as a second mobile platform present in the predetermined range of the first mobile platform, and thus is counted in the quantity of the second mobile platform(s) present within the predetermined range of the first mobile platform.

In some embodiments, when the communication control device determines the quantity of the second mobile platform(s) present within the predetermined range of the first mobile platform according to the signal strengths and device identifications of the first broadcast signals, the communication control device can be configured to obtain a first broadcast signal with a signal strength greater than or equal to the predetermined strength threshold. When the first broadcast signal with the signal strength being greater than or equal to the predetermined strength threshold is detected to have the same device identification, a quantity of the second mobile platform(s) having the signal strength greater than or equal to the predetermined strength threshold and corresponding to the first broadcast signals having the same device identification can be determined to be one. A first quantity of the first broadcast signals having different device identifications and signal strengths greater than or equal to the predetermined strength threshold can be obtained. A sum of the first number and one can be determined to be the quantity of the second mobile platform(s) present in the predetermined range of the first mobile platform.

For example, assuming that the first mobile platform receives N first broadcast signals with signal strengths greater than or equal to the preset strength threshold, if the first broadcast signals are detected to carry M identical device identifications A, and M is an integer smaller than N, the first broadcast signals carrying the same device identification A can be determined to correspond to the same second mobile platform. That is, the quantity of the second mobile platform(s) corresponding to the first broadcast signals carrying the same device identification A can be determined to be one. The first quantity of the first broadcast signals with different device identifications can be obtained to be N−M. Thus, N−M+1 can be then determined to be the quantity of the second mobile platform(s) within the predetermined range of the first mobile platform.

In some embodiments, when determining the quantity of the second mobile platform(s) present within the predetermined range of the first mobile platform according to the signal strengths and device identifications of the first broadcast signals, the communication control device can obtain the first broadcast signal with the signal strength greater than or equal to the predetermined strength threshold. When the same device identification is not detected in the first broadcast signals with the signal strengths greater than or equal to the predetermined strength threshold, the communication control device can further obtain the second quantity of the first broadcast signals with the signal strength greater than or equal to the predetermined strength threshold. The communication control device can determine the second number to be the quantity of the second mobile flatforms present in the predetermined range of the first mobile platform.

For example, assuming that the first mobile platform receives N first broadcast signals with the signal strengths greater than or equal to the predetermined strength threshold, if the first broadcast signals are detected to carry N different device identifications, the N first broadcast signals can be determined to be sent by different second mobile platforms, respectively. Thus, the second quantity of the first broadcast signals with different device identifications can be N, and N can be determined to be the quantity of the second mobile platform(s) present within the predetermined range of the first mobile platform.

At S303, according to the quantity of the second mobile platform(s), a strategy for selecting a frequency to be used by the first mobile platform when transmitting the downstream signals to the first controller is determined.

In embodiments of the present disclosure, the communication control device can determine the strategy for selecting a frequency to be used by the first mobile platform when transmitting the downstream signals to the first controller according to the quantity of the second mobile platform(s).

In some embodiments, when the communication control device determines the strategy for selecting a frequency to be used by the first mobile platform according to the quantity of the second mobile platform(s), and the quantity of the second mobile platform(s) is within the first quantity range, the first mobile platform can be determined to use a first frequency strategy. The first frequency strategy can be used to instruct to select the frequency band to be used by the first mobile platform from a plurality of first designated frequency bands. In some embodiments, a bandwidth of a first designated frequency band can be 40 MHz. In some embodiments, the plurality of first designated frequency bands can be two frequency bands each with the bandwidth of 40 MHz. In some embodiments, the first quantity range can be a predetermined threshold. Thus, the plurality of second mobile platforms can be ensured to select appropriate frequency bands when performing the data transmission to improve the data transmission efficiency.

Figure 6:
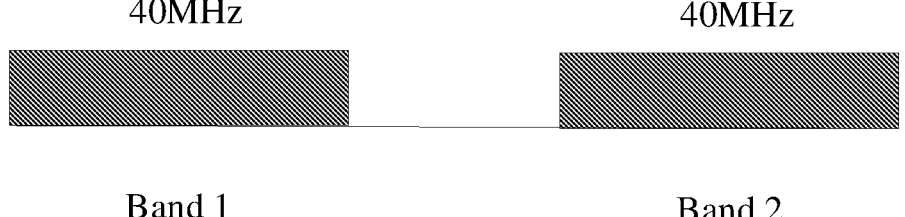
FIG. 6 is a schematic diagram showing frequency bands consistent with an embodiment of the present disclosure.

In some embodiments, FIG. 6 is a schematic diagram showing the frequency bands consistent with an embodiment of the present disclosure. Assuming that quantity L of the second mobile platform is within the first quantity range [1, L1], the first frequency strategy can be used to select one frequency band from the two fixed frequency bands with the bandwidth of 40 MHz, i.e., band 1 and band 2, to be the frequency band to be used by the first mobile platform.

In some embodiments, when the communication control device determines the strategy for selecting a frequency to be used by the first mobile platform according to the quantity of the second mobile platform(s), and the quantity of the second mobile platform(s) is within a second quantity range, the first mobile platform can be determined to use a second frequency strategy. The second frequency strategy can be used to instruct to select a frequency band to be used by the first mobile platform from a plurality of second designated frequency bands. In some embodiments, the plurality of second designated frequency bands can be four frequency bands each with the bandwidth of 20 MHz. In some embodiments, the second quantity range can be greater than the first quantity range. In some embodiments, the second quantity range can include a predetermined threshold. Thus, the second mobile platform can be ensured to select the appropriate frequency band when performing the data transmission to improve the data transmission efficiency.

Figure 7:
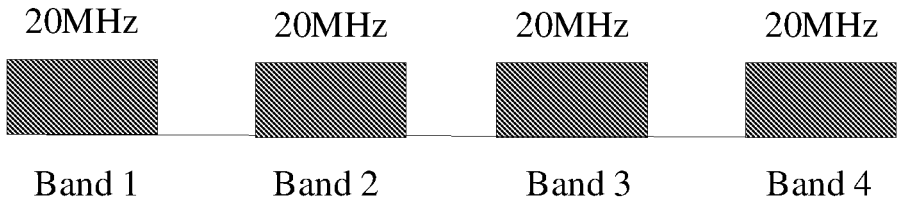
FIG. 7 is a schematic diagram showing other frequency bands consistent with an embodiment of the present disclosure.

FIG. 7 is a schematic diagram showing other frequency bands consistent with an embodiment of the present disclosure. Assuming that quantity L of the second mobile platform is within the second quantity range (L1,∞), the second frequency strategy can be used to select one frequency band from the four fixed frequency bands with the bandwidth of 20 MHz, i.e., band 1, band 2, band 3, and band 4, as the frequency band to be used by the first mobile platform.

In some embodiments, when the communication control device determines the strategy for selecting a frequency used by the first mobile platform according to the quantity of the second mobile platform(s), and the quantity of the second mobile platform(s) is 0, the communication control device can determine that the first mobile platform uses a self-adaptive algorithm to select the frequency band. That is, when the quantity of the second mobile platform(s) is determined to be 0, no second mobile platform can be determined to be present in the surrounding environment of the first mobile platform. The first mobile platform can perform data transmission independently and can directly use the self-adaptive algorithm to select the optimal frequency band. Thus, when no second mobile platform is determined to be present in the surrounding environment of the first mobile platform, the optimal frequency band can be selected. Therefore, the data transmission efficiency can be improved.

The frequency band for the data transmission can be selected by determining the quantity of the second mobile platform(s), the flexibility of the frequency band selection and the data transmission efficiency can be improved.

In embodiments of the present disclosure, the communication control device can be configured to obtain the one or more first broadcast signals received by the first mobile platform within the predetermined time range via the first communication link, determine the quantity of the second mobile platform(s) present in the predetermined range of the first mobile platform according to the signal information of the one or more first broadcast signals, and determine the strategy for selecting a frequency to be used by the first mobile platform when transmitting the downstream signal to the first controller according to the quantity of the second mobile platform(s). Thus, the interference when the plurality of mobile platforms perform the data transmission can be lowered, and the data transmission efficiency can be improved.

Figure 8:
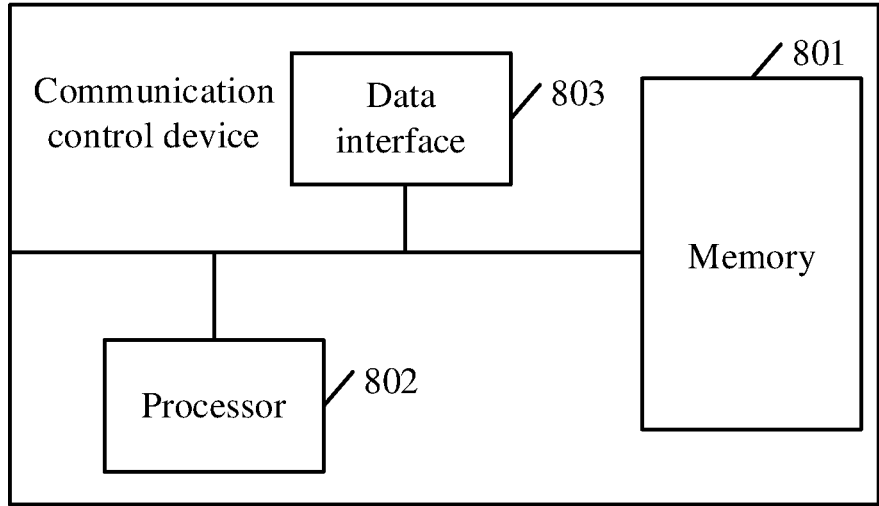
FIG. 8 is a schematic structural diagram of a communication control device consistent with an embodiment of the present disclosure.

FIG. 8 is a schematic structural diagram of a communication control device consistent with an embodiment of the present disclosure. In some embodiments, the communication control device includes a memory 801 and a processor 802.

In some embodiments, the communication control device further includes a data interface 803. The data interface 803 can be configured to transmit data information between the communication control device and another device.

The memory 801 can include a volatile memory, a nonvolatile memory, or a combination thereof. The processor 802 can be a central processing unit (CPU). The processor 802 can further include a hardware chip. The hardware chip can be an application-specific integrated circuit (ASIC), a programmable logic device (PLD), or a combination thereof. The PLD can be a complex programmable logic device (CPLD), a field-programmable logic gate array (FPGA), or a combination thereof.

The memory 801 can be used to store a program. The processor 802 can call the program stored in the memory 801 to obtain the one or more first broadcast signals received by the first mobile platform within the predetermined time range via the first communication link, determine the quantity of the second mobile platform(s) present within the predetermined range of the first mobile platform according to the signal information of the one or more first broadcast signals, and determine the strategy for selecting a frequency to be used by the first mobile platform when transmitting the downstream signal to the first controller based on the quantity of the second mobile platform(s).

Further, when obtaining the one or more first broadcast signals received by the first mobile platform within the predetermined time range via the first communication link, the processor 802 can be configured to select the first position from the predetermined position set according to the predetermined cycle and obtain the first broadcast signals received by the first mobile platform at the first position.

Further, the signal information can include the signal strength and the device identification. When determining the quantity of the second mobile platform(s) present within the predetermined range of the first mobile platform according to the signal information of the one or more first broadcast signals, the processor 802 can be configured to obtain the signal strengths and the device identifications of the first broadcast signals and determine the quantity of the second mobile platform(s) present in the predetermined range of the first mobile platform according to the signal strength and the device identification of the first broadcast signals. The device identification can be used to indicate the second mobile platform sending the first broadcast signal.

Further, when determining the quantity of the second mobile platform(s) present within the predetermined range of the first mobile platform according to the signal strengths and the device identifications of the first broadcast signals, the processor 802 can be configured to obtain the first broadcast signal with the signal strength greater than or equal to the predetermined strength threshold, determine that the quantity of the second mobile platform(s) with the signal strength greater than or equal to the predetermined strength threshold and corresponding to the first broadcast signals with the same device identification is one when detecting that the same device identification exists in the first broadcast signals with the signal strengths greater than or equal to the predetermined strength threshold, obtain the first quantity of the first broadcast signals with the signal strength greater than or equal to the strength threshold and having different device identifications, and determine that the sum of the first quantity and one is the quantity of the second mobile platform(s) present within the predetermined range of the first mobile platform.

Further, when determining the quantity of the second mobile platform(s) present within the predetermined range of the first mobile platform according to the signal strengths and device identifications of each first broadcast signal, the processor 802 can be configured to obtain the first broadcast signal with the signal strength greater than or equal to the predetermined strength threshold, obtain the second quantity of the first broadcast signals with the signal strength greater than or equal to the predetermined strength threshold, and determine the second quantity to be the quantity of the second mobile platform(s) present within the predetermined range of the first mobile platform.

Further, when determining the strategy for selecting a frequency to be used by the first mobile platform according to the quantity of the second mobile platform(s), the processor 802 can be configured to determine that the first mobile platform uses the first frequency strategy when the quantity of the second mobile platform(s) is within the first quantity range and determine that the first mobile platform uses the second frequency strategy when the quantity of the second mobile platform(s) is within the second quantity range. The first frequency strategy can be used to indicate the selection of the frequency band to be used by the first mobile platform from the plurality of first designated frequency bands. The second frequency strategy can be used to indicate to select the frequency band to be used by the first mobile platform from the plurality of second designated frequency bands.

In some embodiments, the bandwidth of the first designated frequency band can be 40 MHz.

In some embodiments, the bandwidth of the second designated frequency band can be 20 MHz.

In some embodiments, when determining the strategy for selecting a frequency used by the first mobile platform according to the quantity of the second mobile platform(s), the processor 802 can be configured to determine that the first mobile platform uses the self-adaptive algorithm to select the frequency band when the quantity of the second mobile platform(s) is zero.

In some embodiments, the first broadcast signal can include one or more pilot sequences.

In some embodiments, the processor 802 can be further configured to select a second position from the predetermined position set according to the predetermined cycle and broadcast the second broadcast signal at the second position.

In embodiments of the present disclosure, the communication control device can be configured to obtain the one or more first broadcast signals received by the first mobile platform within the predetermined time range via the first communication link, determine the quantity of the second mobile platform(s) present within the predetermined range of the first mobile platform according to the signal information of the one or more first broadcast signals, and determine the strategy for selecting a frequency to be used by the first mobile platform when transmitting the downstream signal to the first controller according to the quantity of the second mobile platform(s). Thus, the interference when the plurality of mobile platforms perform the data transmission can be reduced, and the data transmission efficiency can be improved.

Embodiments of the present disclosure also provide a mobile platform. The mobile platform can be the first mobile platform. The mobile platform can include a body, a power system arranged at the body and configured to provide movement power for the mobile platform, and a processor. The processor can be configured to obtain the one or more first broadcast signals received by the first mobile platform within the predetermined time range via the first communication link, determine the quantity of the second mobile platform(s) present in the predetermined range of the first mobile platform according to the signal information of the one or more first broadcast signals, and determine the strategy for selecting a frequency to be used by the first mobile platform when transmitting the downstream signal to the first controller according to the quantity of the second mobile platform(s).

In some embodiments, when obtaining the one or more first broadcast signals received by the first mobile platform within the predetermined time range via the first communication link, the processor can be configured to select the first position from the predetermined position set according to the predetermined cycle and obtain the first broadcast signal received by the first mobile platform at the first position.

In some embodiments, the signal information can include the signal strength and the device identification. When determining the quantity of the second mobile platform(s) present within the predetermined range of the first mobile platform according to the signal information of the one or more first broadcast signals, the processor can be configured to obtain the signal strengths and the device identifications of the first broadcast signals and determine the quantity of the second mobile platform(s) present in the predetermined range of the first mobile platform according to the signal strengths and the device identifications of the first broadcast signals. The device identification can be used to indicate the second mobile platform sending the first broadcast signal.

In some embodiments, when determining the quantity of the second mobile platform(s) present within the predetermined range of the first mobile platform according to the signal strengths and the device identifications of the first broadcast signals, the processor can be configured to obtain the first broadcast signal with the signal strength greater than or equal to the predetermined strength threshold, determine that the quantity of the second mobile platform(s) with the signal strengths greater than or equal to the predetermined strength threshold and corresponding to the first broadcast signals with the same device identification is one when detecting that the same device identification exists in the first broadcast signals with the signal strengths greater than or equal to the predetermined strength threshold, obtain the first quantity of the first broadcast signals with the signal strength greater than or equal to the strength threshold and having different device identifications, and determine that the sum of the first quantity and one is the quantity of the second mobile platform(s) present within the predetermined range of the first mobile platform.

In some embodiments, when determining the quantity of the second mobile platform(s) present within the predetermined range of the first mobile platform according to the signal strengths and device identifications of each first broadcast signal, the processor can be configured to obtain the first broadcast signal with the signal strength greater than or equal to the predetermined strength threshold, obtain the second quantity of the first broadcast signals with the signal strengths greater than or equal to the predetermined strength threshold, and determine the second quantity to be the quantity of the second mobile platform(s) present within the predetermined range of the first mobile platform.

In some embodiments, when determining the strategy for selecting a frequency to be used by the first mobile platform according to the quantity of the second mobile platform(s), the processor can be configured to determine that the first mobile platform uses the first frequency strategy when the quantity of the second mobile platform(s) is within the first quantity range and determine that the first mobile platform uses the second frequency strategy when the quantity of the second mobile platform(s) is within the second quantity range. The first frequency strategy can be used to indicate the selection of the frequency band to be used by the first mobile platform from the plurality of first designated frequency bands. The second frequency strategy can be used to indicate to select the frequency band to be used by the first mobile platform from the plurality of second designated frequency bands.

In some embodiments, the bandwidth of the first designated frequency band can be 40 MHz.

In some embodiments, the bandwidth of the second designated frequency band can be 20 MHz.

In some embodiments, when determining the strategy for selecting a frequency strategy used by the first mobile platform according to the quantity of the second mobile platform(s), the processor can be configured to determine that the first mobile platform uses the self-adaptive algorithm to select the frequency band when the quantity of the second mobile platform(s) is zero.

In some embodiments, the first broadcast signal can include one or more pilot sequences.

In some embodiments, the processor can be further configured to select a second position from the predetermined position set according to the predetermined cycle and broadcast the second broadcast signal at the second position.

In embodiments of the present disclosure, the mobile platform can be configured to obtain the one or more first broadcast signals received by the first mobile platform within the predetermined time range via the first communication link, determine the quantity of the second mobile platform(s) present within the predetermined range of the first mobile platform according to the signal information of the one or more first broadcast signals, and determine the strategy for selecting a frequency to be used by the first mobile platform when transmitting the downstream signal to the first controller according to the quantity of the second mobile platform(s). Thus, the interference when the plurality of mobile platforms perform the data transmission can be reduced, and the data transmission efficiency can be improved.

Embodiments of the present disclosure further provide a computer-readable storage medium. The computer-readable storage medium can store a computer program that, when executed by a processor, causes the processor to perform the method of FIG. 3 and implement the device of FIG. 8, which is not repeated here.

The computer-readable storage medium can be an internal storage unit of the above device, for example, a hard drive or memory of the device. The computer-readable storage medium can also be an external storage device of the device, for example, a plug-in hard drive equipped at the device, a smart memory card (SMC), a secure digital (SD) card, a Flash Card, etc. In some embodiments, the computer-readable storage medium can also include the internal storage unit and the external storage device of the device. The computer-readable storage medium can be used to store the computer program and other programs and data required by the terminal. The computer-readable storage medium can also be used to temporarily store data that has been output or will be output.

The above are only some embodiments of the present disclosure, which cannot limit the scope of the present disclosure. Equivalent modifications made according to the claims of the present invention are still within the scope of the present invention.

What is claimed is:

1. A communication control method comprising:
in response to a communication between a first mobile platform and a first controller via a first communication link, obtaining one or more broadcast signals received by the first mobile platform within a predetermined time range, the one or more broadcast signals sent by a second mobile platform;
determining an in-range platform quantity of the second mobile platform present in a predetermined range of the first mobile platform according to signal information of each of the one or more broadcast signals, the signal information including a device identification indicating a mobile platform sending a corresponding broadcast signal, and determining the in-range platform quantity including:
obtaining the device identification of each of the one or more broadcast signals; and
determining the in-range platform quantity according to the device identification of each of the one or more broadcast signals; and
determining a strategy for selecting a frequency to be used by the first mobile platform when communicating with the first controller via the first communication link according to the in-range platform quantity.

2. The method according to claim 1, wherein obtaining the one or more broadcast signals received by the first mobile platform within the predetermined time range includes:
selecting a position from a predetermined position set according to a predetermined cycle; and obtaining a broadcast signal received by the first mobile platform at the position as one of the one or more broadcast signals.

3. The method according to claim 1, wherein:
the signal information further includes a signal strength; and
determining the in-range platform quantity further includes:
obtaining the signal strength of each of the one or more broadcast signals; and
determining the in-range platform quantity according to the signal strength and the device identification of each of the one or more broadcast signals.

4. The method according to claim 3, wherein determining the in-range platform quantity according to the signal strength and the device identification of each of the one or more broadcast signals includes:
determining, from the one or more broadcast signals, one or more candidate broadcast signals having a same device identification and each having the signal strength greater than or equal to a predetermined strength threshold; and
determining one mobile platform corresponding to the one or more candidate broadcast signals as one second mobile platform present in the predetermined range of the first mobile platform.

5. The method according to claim 1, wherein determining a strategy for selecting a frequency to be used by the first mobile platform according to the in-range platform quantity includes:
in response to the in-range platform quantity being in a first quantity range, determining that the first mobile platform uses a first frequency strategy, the first frequency strategy being used to indicate to select a frequency band to be used by the first mobile platform from a plurality of first designated frequency bands; and
in response to the in-range quantity being in a second quantity range, determining that the first mobile platform uses a second frequency strategy, the second frequency strategy being used to indicate to select the frequency band to be used by the first mobile platform from a plurality of second designated frequency bands.

6. The method according to claim 5, wherein:
a bandwidth of each of the first designated frequency bands is 40 MHz; and/or
a bandwidth of each of the second designated frequency bands is 20 MHz.

7. The method according to claim 1, wherein determining the strategy for selecting a frequency to be used by the first mobile platform according to the in-range platform quantity includes:
in response to the in-range platform quantity being zero, determining that the first mobile platform uses a self-adaptive algorithm to select a frequency band.

8. The method according to claim 1, wherein each of the one or more broadcast signals includes one or more pilot sequences.

9. The method according to claim 1,
wherein the one or more broadcast signals are one or more first broadcast signals,
the method further comprising:
selecting a position from a predetermined position set within a predetermined cycle; and
broadcasting a second broadcast signal at the position.

10. A communication control device comprising:
one or more processors; and one or more memories storing one or more programs that, when executed by the one or more processor, cause the one or more processors to:

in response to a communication between a first mobile platform and a first controller via a first communication link, obtain one or more broadcast signals received by the first mobile platform within a predetermined time range, the one or more broadcast signals sent by a second mobile platform;

determine an in-range platform quantity of the second mobile platform present in a predetermined range of the first mobile platform according to signal information of each of the one or more broadcast signals, the signal information including a device identification indicating a mobile platform sending a corresponding broadcast signal, and determining the in-range platform quantity including:

obtaining the device identification of each of the one or more broadcast signals; and determining the in-range platform quantity according to the device identification of each of the one or more broadcast signals; and determine a strategy for selecting a frequency to be used by the first mobile platform when communicating with the first controller via the first communication link according to the in-range platform quantity.

11. The device according to claim 10, wherein the one or more processor are further configured to:

select a position from a predetermined position set according to a predetermined cycle; and obtain a broadcast signal received by the first mobile platform at the position as one of the one or more broadcast signals.

12. The device according to claim 11, wherein:

the signal information further includes a signal strength; and the one or more processor are further configured to:

obtain the signal strength of each of the one or more broadcast signals; and determine the in-range platform quantity according to the signal strength and the device identification of each of the one or more broadcast signals.

13. The device according to claim 12, wherein the one or more processor are further configured to:

determine, from the one or more broadcast signals, one or more candidate broadcast signals having a same device identification and each having the signal strength greater than or equal to a predetermined strength threshold; and determine one mobile platform corresponding to the one or more candidate broadcast signals as one second mobile platform present in the predetermined range of the first mobile platform.

14. The device according to claim 10, wherein the one or more processor are further configured to:

in response to the in-range platform quantity being in a first quantity range, determine that the first mobile platform uses a first frequency strategy, the first frequency strategy being used to indicate to select a frequency band to be used by the first mobile platform from a plurality of first designated frequency bands; and in response to the in-range quantity being in a second quantity range, determine that the first mobile platform uses a second frequency strategy, the second frequency strategy being used to indicate to select the frequency band to be used by the first mobile platform from a plurality of second designated frequency bands.

15. The device according to claim 14, wherein:

a bandwidth of each of the first designated frequency bands is 40 MHz; and/or a bandwidth of each of the second designated frequency bands is 20 MHz.

16. The device according to claim 10, wherein the one or more processor are further configured to:

in response to the in-range platform quantity being zero, determine that the first mobile platform uses a self-adaptive algorithm to select a frequency band.

17. The device according to claim 10, wherein each of the one or more broadcast signals includes one or more pilot sequences.

18. The device according to claim 10, wherein:

the one or more broadcast signals are one or more first broadcast signals; and the one or more processor are further configured to:

select a position from a predetermined position set within a predetermined cycle; and broadcast a second broadcast signal at the position.

19. The device according to claim 10, wherein:

the communication control device is arranged at or independent from the first mobile platform.

20. A mobile platform being a first mobile platform and comprising:

a body;

a power system arranged at the body and configured to provide dynamic power for the mobile platform to move; and one or more processors configured to:

in response to a communication between the first mobile platform and a first controller via a first communication link, obtain one or more broadcast signals received by the first mobile platform within a predetermined time range, the one or more broadcast signals sent by a second mobile platform;

determine an in-range platform quantity of the second mobile platform present in a predetermined range of the first mobile platform according to signal information of each of the one or more broadcast signals, the signal information including a device identification indicating a mobile platform sending a corresponding broadcast signal, and determining the in-range platform quantity including:

obtaining the device identification of each of the one or more broadcast signals; and determining the in-range platform quantity according to the device identification of each of the one or more broadcast signals; and determine a strategy for selecting a frequency to be used by the first mobile platform when communicating with the first controller via the first communication link according to the in-range platform quantity.

* * * * *